United States Patent [19]

Layland

[11] Patent Number: 5,083,426
[45] Date of Patent: Jan. 28, 1992

[54] INTEGRATED ENGINE SHROUD FOR GAS TURBINE ENGINES

[75] Inventor: Michael J. Layland, Bonita, Calif.

[73] Assignee: Rohr Industries, Inc., Chula Vista, Calif.

[21] Appl. No.: 415,788

[22] Filed: Oct. 2, 1989

[51] Int. Cl.$^5$ .............................. F02K 3/02; B32B 3/12
[52] U.S. Cl. ...................... 60/226.1; 428/116
[58] Field of Search ............. 428/116; 60/226.1, 39.31

[56] References Cited

U.S. PATENT DOCUMENTS

| | | | |
|---|---|---|---|
| 3,301,732 | 1/1967 | Kunz | 428/116 |
| 3,890,108 | 6/1975 | Welsh | 428/116 |
| 4,825,648 | 5/1989 | Adamson | 60/226.1 |
| 4,826,106 | 5/1989 | Anderson | 428/116 |
| 4,917,747 | 4/1990 | Chin et al. | 428/116 |

Primary Examiner—Louis J. Casaregola
Assistant Examiner—John A. Savio, III
Attorney, Agent, or Firm—Patrick J. Schlesinger; Frank D. Gilliam

[57] ABSTRACT

An integral "C" duct for the thrust reverser region of ducted fan gas turbine engines. The integral duct is useful in a turbine engine having a core engine surrounded by an engine casing and nacelle, with a fan at the inlet directing air flow into the bypass duct between core engine and engine nacelle. The "C" duct basically consists of right and left "C" shaped ducts with bifurcations (radial flanges) permitting the halves to be fastened together to produce a tubular duct adapted to surround a gas turbine engine and form the inner wall of a bypass duct. The disclosed duct eliminates the prior complex corner fittings connecting the "C" shaped portion of the duct and the bifurcations and provides simple, integral corners.

12 Claims, 3 Drawing Sheets

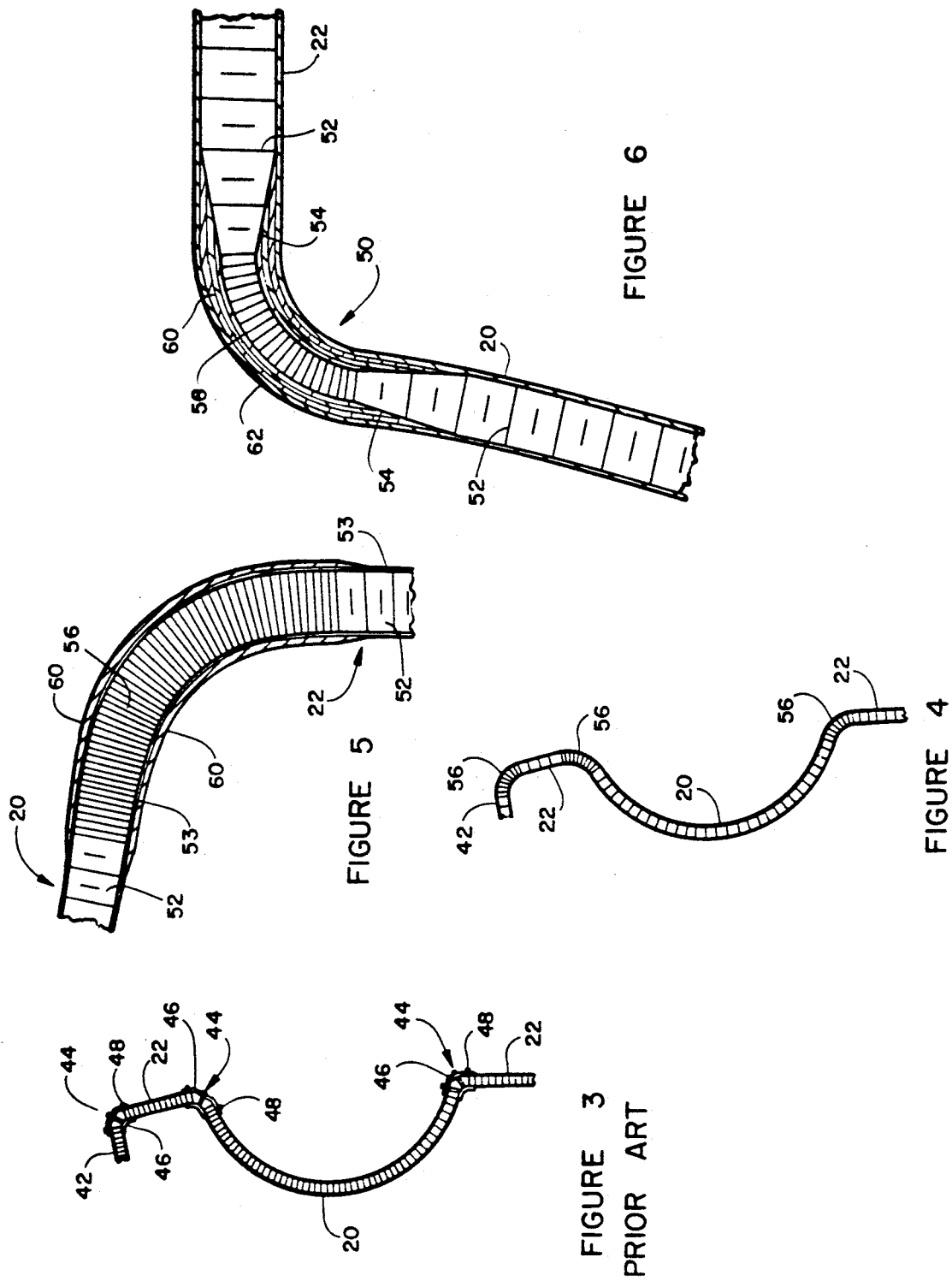

INTEGRATED ENGINE SHROUD FOR GAS TURBINE ENGINES

BACKGROUND OF THE INVENTION

This invention relates in general to engine shrouds for gas turbine engines and, more specifically, to an improved integral duct for those shrouds.

Ducted fan jet engines for aircraft applications have come into widespread use. Such engines include a core engine within a streamlined shroud, a stage of fan blades mounted upstream of the engine and driven thereby, and a nacelle surrounding the fan blades and shroud and spaced from the shroud to provide a bypass duct between nacelle and shroud through which compressed air is forced by the fan blades.

The shroud which surrounds the engine and forms both the housing for the engine and the interior wall of the bypass duct is often formed from two halves which are fastened together to form the shroud. This arrangement facilitates engine servicing, removal and reinstallation. Each shroud half consists of a center section having a "C" shaped transverse cross-section which forms half of the tubular shroud around the engine and two radially extending bifurcations (flanges) attached to the edges of the "C" sections to aid in supporting the shroud within the engine casing and nacelle and to carry means for securing the shroud halves together.

Ordinarily, the "C" sections and the bifurcations, are separately constructed honeycomb panels, mechanically joined by means of metallic corner angles or other clamping and fastening arrangements.

While these prior corner fastening methods have been effective, they are cumbersome, heavy, require considerable skill to install and are more expensive and less reliable than a continuous integral panel would be. Thus, there is a continuing need by for shrouds formed as a continuous panel, eliminating corner fittings and mechanical fasteners.

SUMMARY OF THE INVENTION

The above-noted problems, and others, are overcome by using a high density formed honeycomb corner piece which is integrated with the "C" section and the bifurcation panels to produce a one piece bonded structure to form the entire shroud with no mechanical fasteners, and continuous face sheets. Additional material in the form of doublers can be added to the face sheets in the corners regions to accommodate highly loaded conditions or attachments of hardware.

BRIEF DESCRIPTION OF THE DRAWING

Details of the invention, and of a preferred embodiment thereof, will be further understood upon reference to the drawing, wherein:

FIG. 3 is a schematic transverse section view through a prior art shroud;

FIG. 4 is a schematic transverse section view through the shroud of this invention;

FIG. 5 is a detail transverse section view through a shroud corner fabricated according to this invention;

FIG. 6 is a detail transverse section view through an alternative embodiment of the shroud corner fabricated according to this invention which permits a tighter corner radius.

DETAILED DESCRIPTION OF A PREFERRED EMBODIMENT

Figure 1:
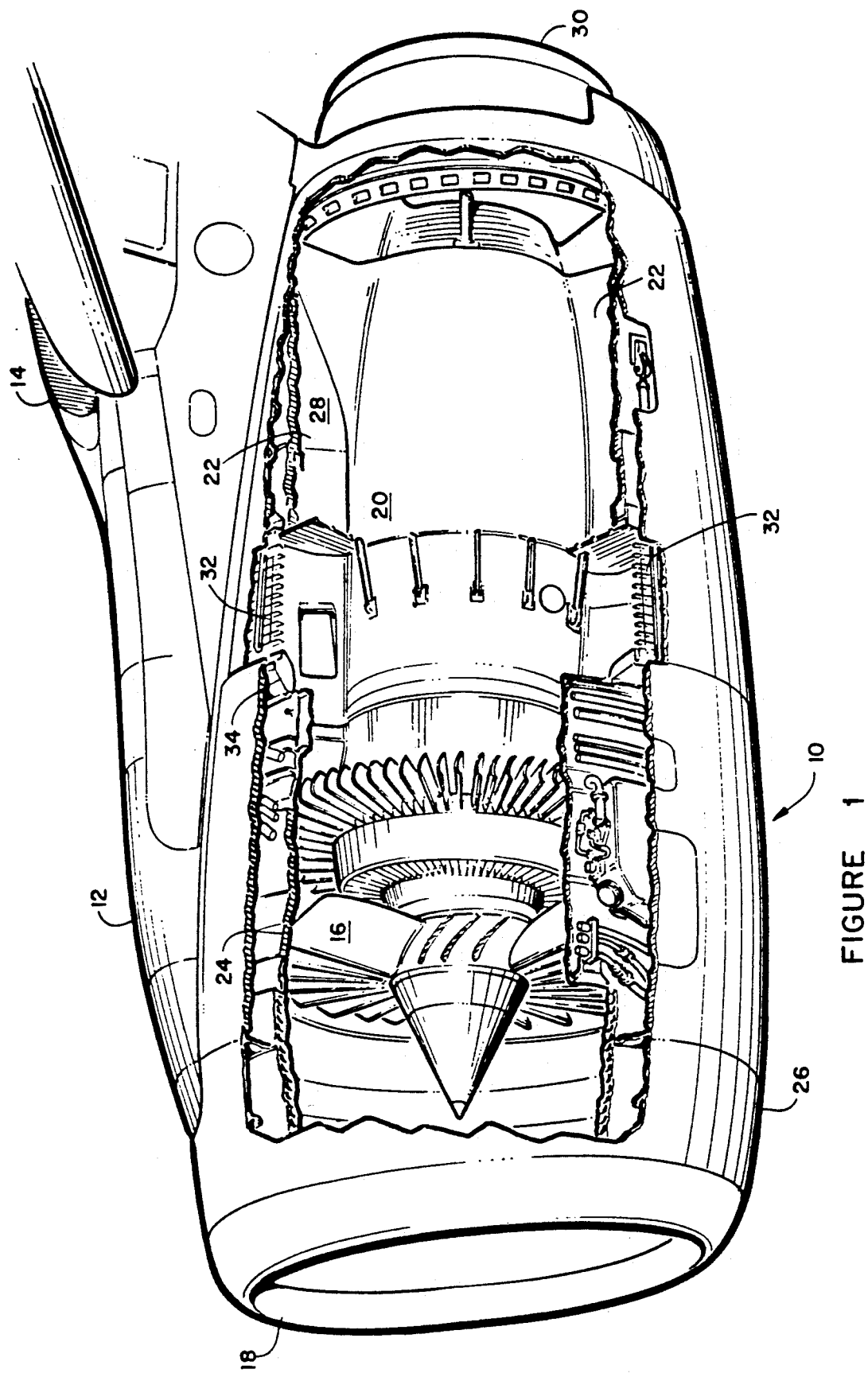
FIG. 1 is a schematic perspective view of fan jet engine, partially cut away to show the improvement of this invention.

Referring now to FIG. 1, there is seen a conventional gas turbine engine 10 of the fan type, mounted by a pylon 12 on an aircraft wing 14. A fan 16 located just within engine inlet 18 is driven by a core engine within engine inner shroud 20. Shroud 20 is ordinarily formed from two approximately "C" shaped halves with edge extensions or flanges 22 which extend to the inner wall of engine casing 24. An annular space lies between shroud 20 and the core engine.

Engine casing 24 within nacelle 26 forms part of the outer wall of a bypass duct 28 between casing 24 and core 20 into and through which fan 16 forces a flow of compressed air. In normal engine operation, the compressed air flows through bypass duct 28 and out engine outlet 30, adding to engine thrust. Thrust reversers 32, including turning vane cascades and torque ring mounting assembly 34, are provided to reverse engine thrust during landing.

Figure 2:
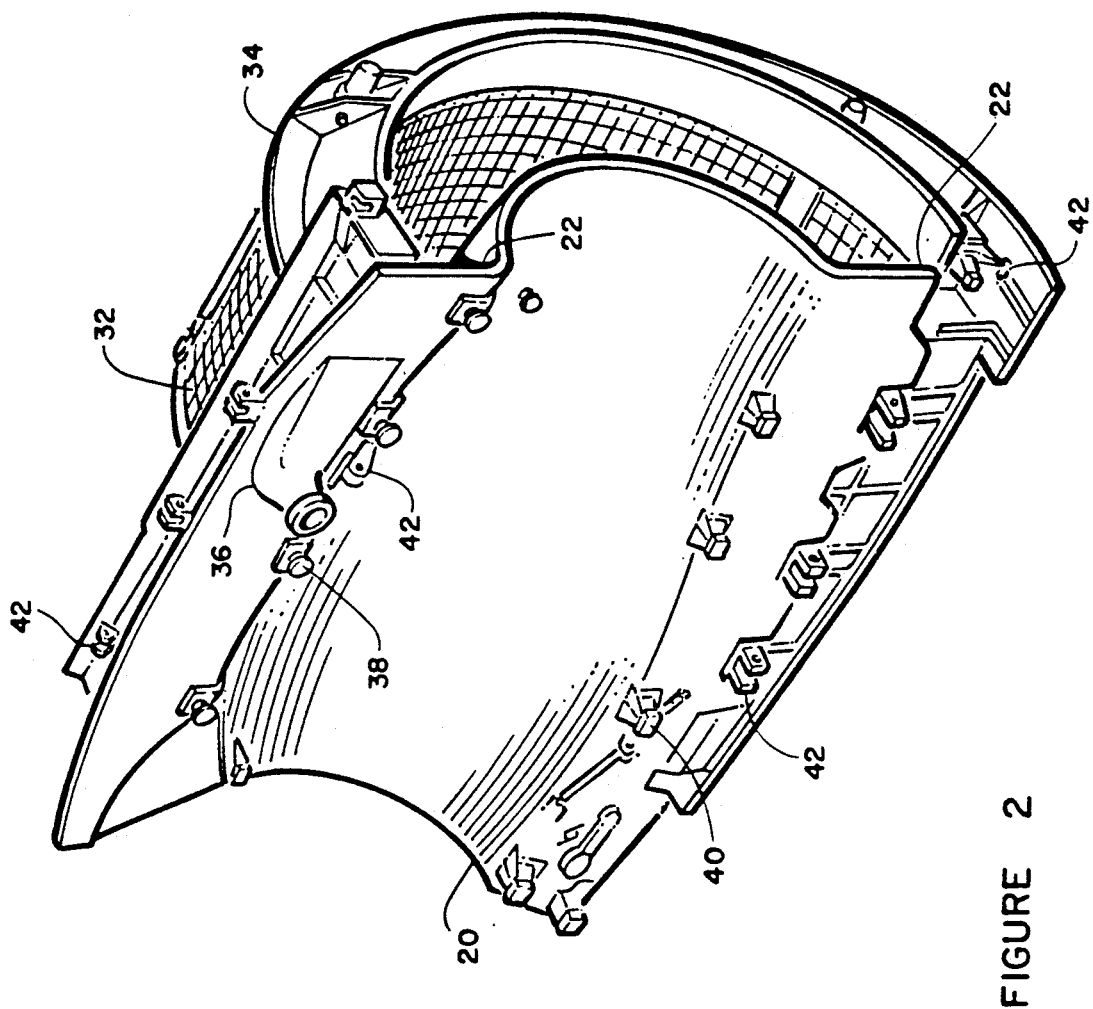
FIG. 2 is a schematic perspective view of one half of an engine shroud.

The left hand half of a typical shroud 20 and nearby portions of the thrust reverser assembly 32 are shown in greater detail in FIG. 2. A variety of components and fittings are typically mounted on or inside the shroud, which when assembled surrounds but is spaced from a conventional engine (not shown). Typical components and fittings include a precooler duct 36, upper and lower bumpers 38 and 40, respectively, various latches 42 for fastening the shroud together and to other structures, etc.

Shroud 20 and bifurcations (flanges) 22 are generally formed from a conventionally manufactured panel comprising a honeycomb core with two continuous face sheets bonded thereto. Typically, the honeycomb core and face sheets may be metal such as aluminum or titanium or a fiber reinforced composite, such as graphite fibers in an epoxy or polyimide matrix.

The prior art method for manufacturing engine shrouds of the sort shown in FIG. 2 is illustrated in transverse section in FIG. 3. The widely curved shroud center section 20 is fabricated by bonding to form a honeycomb panel. Separate pieces of honeycomb panel form the bifurcation flanges 22, including any further extensions 42 as may be desired. Corner fittings 44, which include splice plates 46 and bolts or rivets 48 are attached to the abutting honeycomb pieces along each intersection. In order to securely fasten bolts 48 to the honeycomb material, which does not have great localized strength, it is necessary to fill the honeycomb cells in the region of the bolt with a potting material, typically a synthetic resin or to inplace inserts of greater density. The shape of the plates 46 must be carefully designed for each corner. Thus, it is apparent that these corner fittings 44 are heavy, expensive, difficult to fabricate and will tend to have less than ideal reliability.

I have found that the need for complex corner fittings 44 can be eliminated and an integral honeycomb shroud can be fabricated by forming a corner section of high density honeycomb 56.

As best seen in FIG. 5, the formed high density honeycomb 56 in section 50 is spliced into the field honeycomb section 52 where ever a bend is to be made. The honeycomb core assembly is bonded to face sheets 53 in a conventional manner resulting in the integral shroud.

While in some cases section 50 may have sufficient strength, in highly loaded portions it may be necessary to add reinforcing plies 60 (for composite applications) or metallic doubles for metallic applications.

If in certain areas a tighter radius is required than can be readily formed in the full height high density core segment 56, then a reduced height segment 58, which is easier to form can be utilized as shown in FIG. 6. The height of the full panel section would preferably be maintained by the addition of reinforcing plies 60 or metallic doubles as appropriate. The transition from the reduced height core 58 to the field core 52 would be accommodated by tapered core pieces 54.

These corners are fabricated as follows:

The high density core corner elements 58 are separately roll formed to the required shape and contour. The completed elements are positioned with adhesive relative to the field core 52. The core assembly is then bonded to the face sheets under heat and pressure to form the complete integrated shroud. Candidate core materials are aluminum, titanium, nickel, HRH 327, graphite, nickel and copper. While certain specific materials, dimensions and methods were detailed in the above description of preferred embodiments, those can be varied, where suitable, with similar results.

I claim:

1. In a gas turbine engine of the type having a core engine, a shroud surrounding the core engine, a tubular outer nacelle defining an annular bypass duct therebetween and a fan disposed in the nacelle inlet for directing compressed gas flow into and through said bypass duct, said shroud formed in two axially divided halves, each having a generally "C" shaped center cross section with radially extending flanges secured to the axial edges of said center section; the improvement wherein:
   each shroud half comprises an integral panel having a honeycomb core and continuous facesheets bonded to both surfaces, wherein corner regions between said center section and said flanges are comprised of a honeycomb core having a higher density than the honeycomb core in said center section and flanges.

2. The improvement according to claim 1 further including at least one reinforcing ply bonded over at least one of said face sheets in said corner regions.

3. The improvement according to claim 2 wherein said reinforcing ply is selected from metal sheets and fiber reinforced resin composite sheets.

4. The improvement according to claim 1 wherein said high density honeycomb core in said corner regions has a thickness less than that of said center section and flanges with tapered transition sections between the thin high density corner regions and said center section and flanges.

5. The improvement according to claim 4 further including a plurality of reinforcing plys on the surfaces of said thin high density corner region so that said shroud has substantially uniform thickness.

6. The improvement according to claim 5 wherein said reinforcing ply is selected from metal sheets and fiber reinforced resin composite sheets.

7. An engine shroud for use in a gas turbine engine which comprises:
   a center section have an generally semicircular cross section;
   at least one radially extending flange section adapted to be connected to said center section along an intersection line therebetween;
   said center and flange sections formed from panel comprising honey comb cores and face sheets adapted to be bonded thereto, said panel cores being difficult to form into tight radii;
   a strip of honeycomb core material, having a higher density than said center and flange sections and a tight transverse radius, bonded between said center and flange sections along said intersection lines; and
   said face sheets extending across said strip and bonded to both the panel and strip cores;
   whereby smooth, lightweight transitions are provided between center and flange sections.

8. The improvement according to claim 7 further including at least one reinforcing ply bonded over at least one said face sheets in the region of said strip.

9. The improvement according to claim 8 wherein said reinforcing ply is selected from metal sheets and fiber reinforced resin composite sheets.

10. The improvement according to claim 7 wherein said high density honeycomb core strip has a thickness less than that of said centers and flange sections with tapered transition sections between the thin high density core and the thicker center and flange section cores.

11. The improvement according to claim 7 further including a plurality of reinforcing plys on the surfaces of said thin high density core strip region so that said shroud has substantially uniform thickness.

12. The improvement according to claim 11 wherein said reinforcing ply is selected from metal sheets and fiber reinforced resin composite sheets.

* * * * *